United States Patent
Sewell et al.

(10) Patent No.: US 7,189,345 B2
(45) Date of Patent: Mar. 13, 2007

(54) METHOD FOR VACUUM ASSISTED RESIN TRANSFER MOLDING

(75) Inventors: Terry A. Sewell, Ballwin, MO (US); Steven P. Wanthal, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 470 days.

(21) Appl. No.: 10/640,136

(22) Filed: Aug. 13, 2003

(65) Prior Publication Data

US 2005/0035478 A1 Feb. 17, 2005

(51) Int. Cl.
*B29C 45/14* (2006.01)

(52) U.S. Cl. .................................. 264/101; 264/257
(58) Field of Classification Search ................. 264/257
See application file for complete search history.

(56) References Cited

U.S. PATENT DOCUMENTS

| | | |
|---|---|---|
| 944,955 A | 12/1909 | Derrick et al. |
| 2,913,036 A | 11/1959 | Smith |
| 3,309,450 A | 3/1967 | Rodgers |
| 3,575,756 A | 4/1971 | Maus |
| 3,703,422 A | 11/1972 | Yoshino |
| 4,124,678 A | 11/1978 | Stroupe |
| 4,238,437 A | 12/1980 | Rolston |
| 4,311,661 A | 1/1982 | Palmer |
| 4,312,829 A | 1/1982 | Fourcher |
| 4,353,862 A | 10/1982 | Kaman, II |
| 4,562,033 A | 12/1985 | Johnson et al. |
| 4,622,091 A | 11/1986 | Letterman |
| 4,873,044 A | 10/1989 | Epel |
| 4,873,055 A | 10/1989 | Culling |
| 4,880,583 A | 11/1989 | Douglas |
| 4,902,215 A | 2/1990 | Seemann, III |
| 4,942,013 A | 7/1990 | Palmer et al. |
| 5,518,385 A * | 5/1996 | Graff .......................... 425/127 |

FOREIGN PATENT DOCUMENTS

GB 944955 12/1963

* cited by examiner

*Primary Examiner*—Edmund H. Lee
(74) *Attorney, Agent, or Firm*—Lee & Hayes, PLLC

(57) ABSTRACT

A method for vacuum assisted resin transfer molding a composite structure including fibers at least partially surrounded by resin using a mold including a tool having a surface shaped to correspond to the composite structure and an inflatable bladder for forcing the composite structure against the tool. A resin inlet is connected to a resin source for introducing resin into a mold cavity at least partially defined by the tool surface and the bladder and a vacuum port spaced from the resin inlet. The method includes the steps of opening the mold cavity, loading fibers into the open mold cavity, closing the loaded mold cavity, introducing resin through the resin inlet into the closed mold cavity loaded with fibers, and pulling a vacuum at the resin inlet and the vacuum port to draw excess resin from the structure prior to curing thereof.

7 Claims, 4 Drawing Sheets

METHOD FOR VACUUM ASSISTED RESIN TRANSFER MOLDING

This invention was made with Government support under F33615-98-3-5104 and SCRA Task order 002 under Subrecipient Agreement No. 2001-508, awarded by the United States Air Force. The Government has certain rights in this invention.

BACKGROUND OF THE INVENTION

The present invention relates generally to resin transfer molding, and more specifically to a method and apparatus for vacuum assisted resin transfer molding.

As an alternative to molding composite structures using a traditional autoclave, resin transfer molding processes are commonly used to mold fiber/resin composites by infusing a fiber preform with resin under a vacuum. To help achieve even distribution of resin throughout the preform and a predetermined thickness of the finished composite structure, some resin transfer molding processes, such as controlled atmospheric pressure resin infusion, utilize a half-atmosphere vacuum, while others, such as double bag vacuum infusion (DBVI), incorporate multiple vacuum bags. However, due to excess resin infused into the preform, known resin transfer molding processes typically produce finished composite structures that are consistently resin rich, have a high per ply thickness, and have a low fiber volume as compared to traditional autoclave-cured composite structures.

SUMMARY OF THE INVENTION

In one aspect, a method is provided for vacuum assisted resin transfer molding a composite structure including fibers at least partially surrounded by resin using a mold including a tool having a surface shaped to correspond to the composite structure and an inflatable bladder for forcing the composite structure against the tool. A resin inlet is connected to a resin source for introducing resin into a mold cavity at least partially defined by the tool surface and the bladder and a vacuum port spaced from the resin inlet. The method includes the steps of opening the mold cavity, loading fibers into the open mold cavity, closing the loaded mold cavity, introducing resin through the resin inlet into the closed mold cavity loaded with fibers, and pulling a vacuum at the resin inlet and the vacuum port to draw excess resin from the structure prior to curing thereof.

In another aspect, the present invention includes a mold for vacuum assisted resin transfer molding a composite structure. The mold includes a tool having a surface shaped to correspond to the composite structure, and an inflatable bladder for forcing the composite structure against the tool surface. The bladder is positioned over the tool surface and generally sealed with the tool surface to form a cavity at least partially defined by the tool surface and the bladder for containing the composite structure therein. The bladder includes a resin inlet in fluid communication with the cavity for introducing resin into the cavity and a vacuum port in fluid communication with the cavity. The vacuum port is spaced from the resin inlet. The mold also includes a pump in fluid communication with the vacuum port for applying a vacuum to the vacuum port to introduce resin into the cavity through the resin inlet. The pump is in fluid communication with the resin inlet for pulling a vacuum at the vacuum port and the resin inlet to draw excess resin from the composite structure through the resin inlet and the vacuum port.

In yet another aspect, the present invention includes a mold for vacuum assisted resin transfer molding a composite structure. The mold includes a tool having a surface shaped to correspond to the composite structure, and an inflatable bladder for forcing the composite structure against the tool surface. The bladder is positioned over the tool surface and generally sealed with the tool surface to form a cavity at least partially defined by the tool surface and the bladder for containing the composite structure therein. The bladder has opposite first and second ends, a resin inlet adjacent the first end in fluid communication with the cavity for introducing resin into the cavity, and a vacuum port adjacent the second end in fluid communication with the cavity. The vacuum port is spaced from the resin inlet. The mold also includes a resin source in fluid communication with the resin inlet, a vacuum reservoir in fluid communication with the vacuum port, and a pump in fluid communication with the vacuum reservoir for applying a vacuum to the vacuum port to introduce resin into the cavity through the resin inlet. The pump is in fluid communication with the resin source for pulling a vacuum at the vacuum port and the resin inlet to draw excess resin from composite structure through the resin inlet and the vacuum port.

In even another aspect, the present invention includes a molded composite structure body having a plurality of fiber plies stacked in face to face relation, wherein each fiber ply of the plurality of fiber plies includes a plurality of reinforcing fibers. The molded composite structure body also includes a resin mixture interspersed between the plurality of reinforcing fibers, and a volume of the plurality of reinforcing fibers comprises at least about sixty percent of a total volume of the composite structure body.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
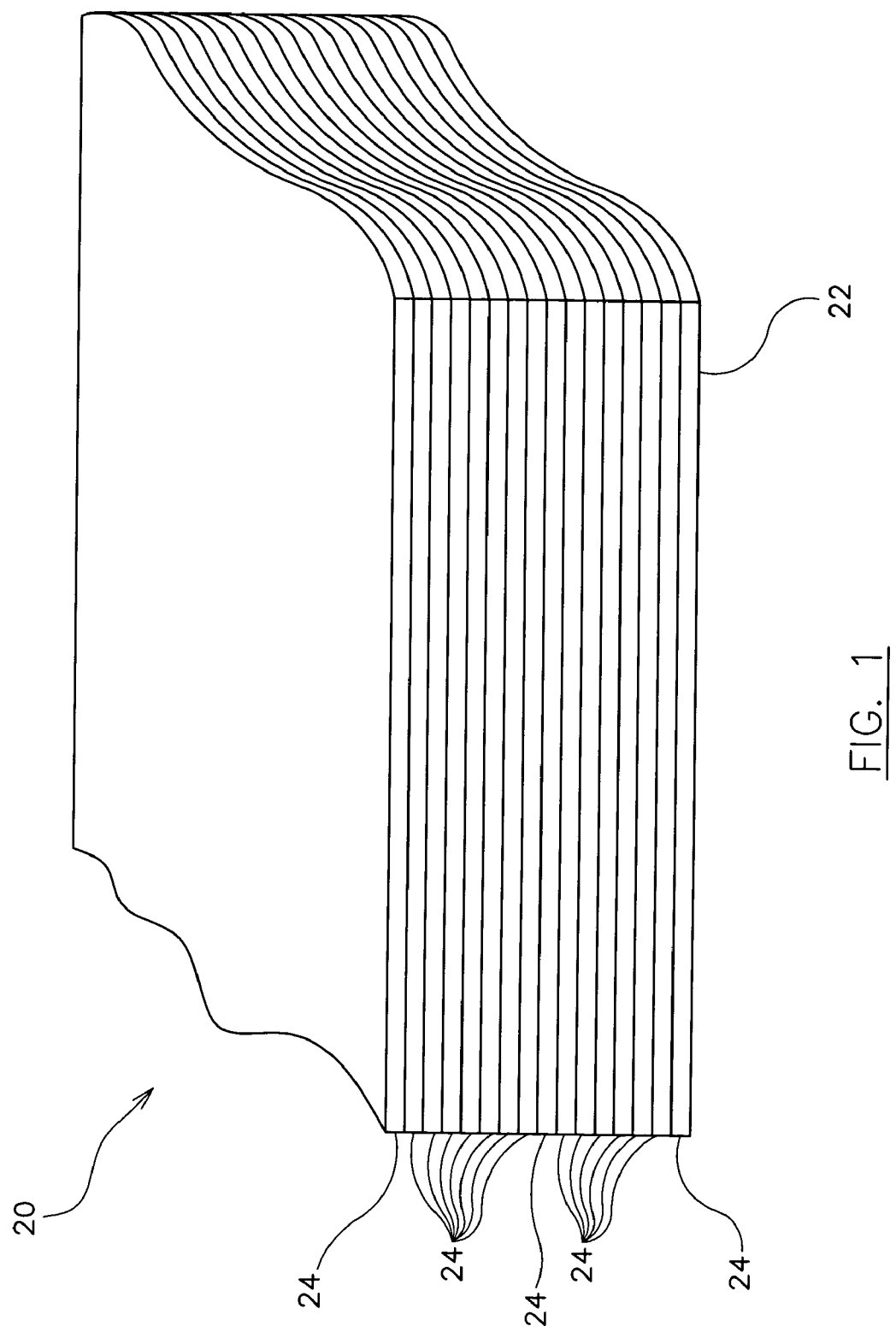
FIG. 1 is a fragmentary perspective of a composite structure molded using a vacuum assisted resin transfer molding process.

Referring now the to the drawings, and more specifically to FIG. 1, a composite structure is designated in its entirety by the reference numeral 20. The composite structure 20 is molded using a vacuum assisted resin transfer molding process and includes a body 22 having a plurality of fiber plies 24 stacked in face to face relation in a predetermined order and orientation. Each fiber ply 24 has a resin mixture (not shown) interspersed between a plurality of reinforcing fibers 28. For some applications, the composite structure 20 may include other materials, for example sheets of metal foil, stacked between the fiber plies 24. In one embodiment, the composite structure 20 is an aircraft component, such as, for example, an integrated stiffened structure for an aircraft wing (not shown), a sub-structure for an aircraft wing, a skin panel for an aircraft (not shown), or a control surface for an aircraft. However, it should be understood that the composite structure 20 may be any composite structure molded using a vacuum assisted resin transfer molding process.

Figure 2:
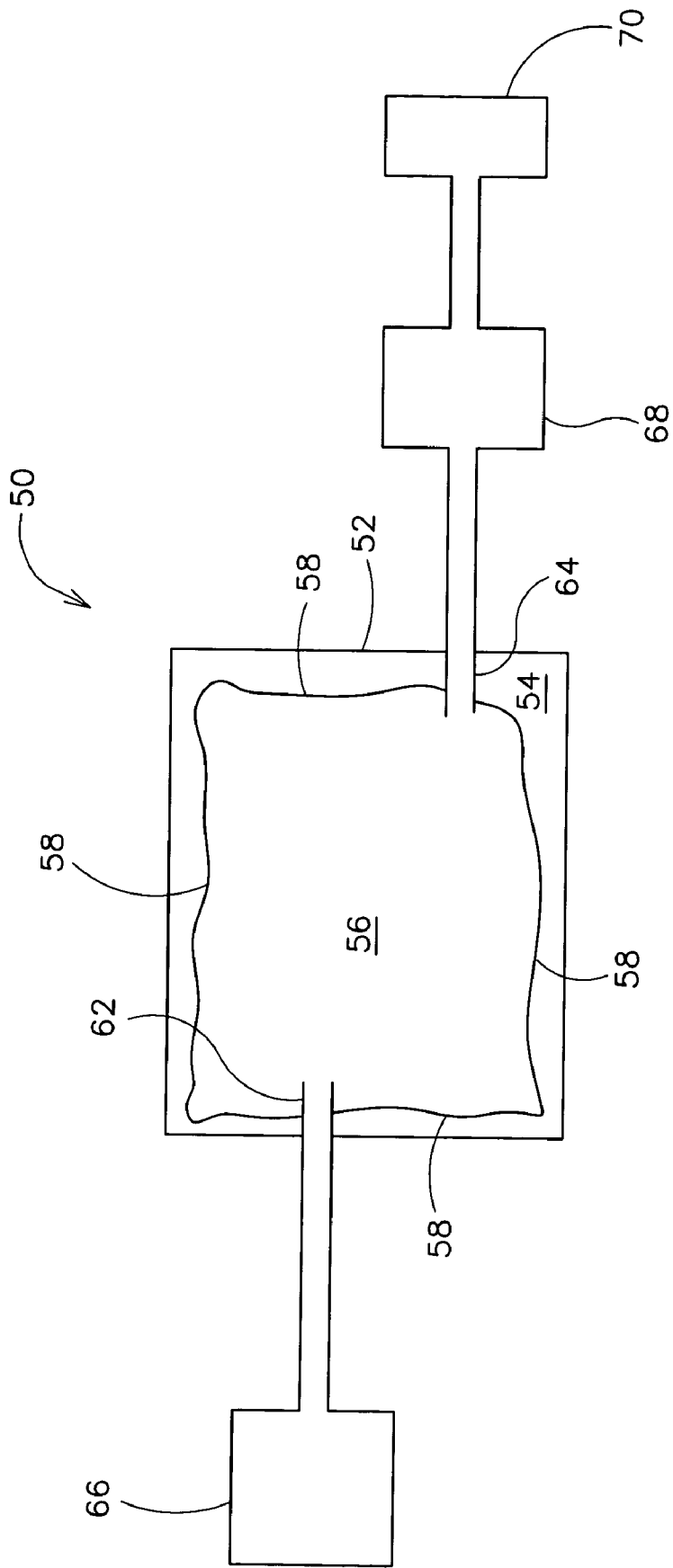
FIG. 2 is a schematic plan of a conventional vacuum assisted resin transfer mold.

As illustrated in FIG. 2, a conventional vacuum assisted resin transfer mold, generally designated by the reference numeral 50, includes a tool 52 having a surface 54 shaped to correspond to a composite structure (e.g. the composite structure 20 illustrated in FIG. 1) and an inflatable bladder 56 (commonly referred to as a vacuum bag) for forcing the composite structure against the tool during a vacuum assisted resin transfer molding process. The bladder 56 is positioned over the tool surface 54 and generally sealed with the tool surface along a plurality of edges 58 of the bladder to form a mold cavity (not shown) at least partially defined by the tool surface and the bladder. The bladder 56 includes a resin inlet 62 in fluid communication with the cavity and a vacuum port 64 in fluid communication with the cavity. Although the conventional mold 50 is illustrated in FIG. 2 and described herein as having only one inflatable bladder 56, many conventional vacuum assisted resin transfer molds include multiple bladders. A resin source 66 containing a supply of resin is in fluid communication with the resin inlet 62, and a vacuum reservoir 68 is in fluid communication with the vacuum port 64. The mold 50 also includes a pump 70 in fluid communication with the vacuum reservoir 68.

To mold the composite structure, at least one edge 58 of the bladder 56 is removed from the tool surface 54 to open the mold cavity. A plurality of fiber plies (e.g., the fiber plies 24 illustrated in FIG. 1), and possibly other materials, are loaded into the mold cavity and stacked to form a preform 72. The cavity is closed by re-sealing the edges 58 removed from the tool surface 54. The pump 70 is then activated to apply a vacuum to the vacuum port 64 and thereby introduce resin into the mold cavity by drawing resin from the resin source 66 through the resin inlet 62 and into the cavity. As the resin is introduced into the mold cavity, the resin infuses in the preform 72, and more specifically the fiber plies, and intersperses between the reinforcing fibers (e.g., the fibers 28 illustrated in FIG. 1) of each ply to form the composite structure. Additionally, the vacuum applied to the mold cavity forces the bladder 56 against the composite structure and thereby forces the composite structure against the tool surface 54. Once the introduction and infusion of resin is complete, the pump 70 is deactivated to terminate introduction of resin into the mold cavity. The composite structure can then be removed from the cavity and processed for ultimate use. In some cases, the composite structure may be cured after being removed from the mold cavity to facilitate bonding the fiber plies and the resin together. As other aspects of conventional vacuum assisted resin transfer molds and their methods of use are well known, they will not be described in further detail.

Figure 3:
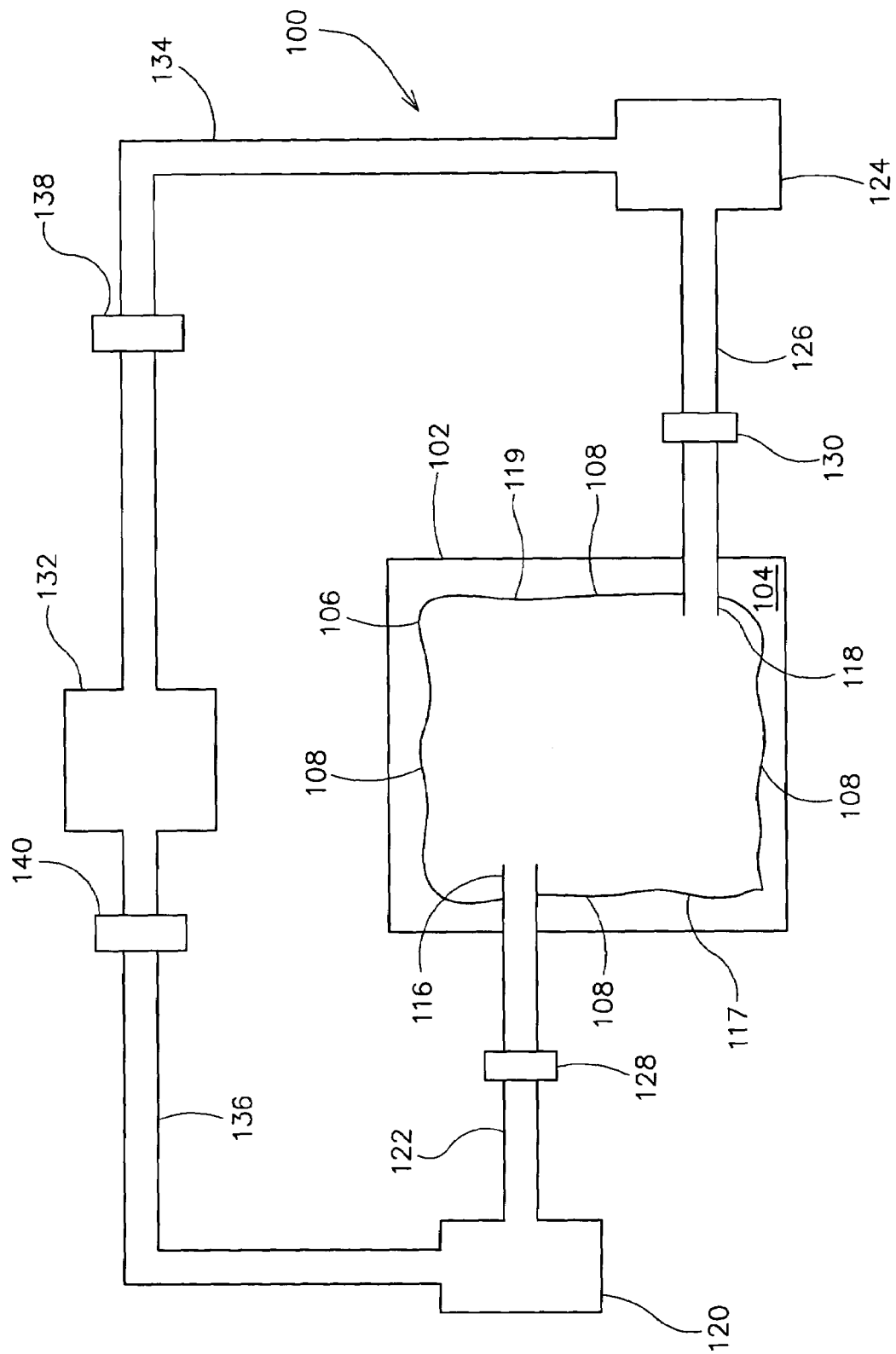
FIG. 3 is a schematic plan of a vacuum assisted resin transfer mold of the present invention.
Figure 4:
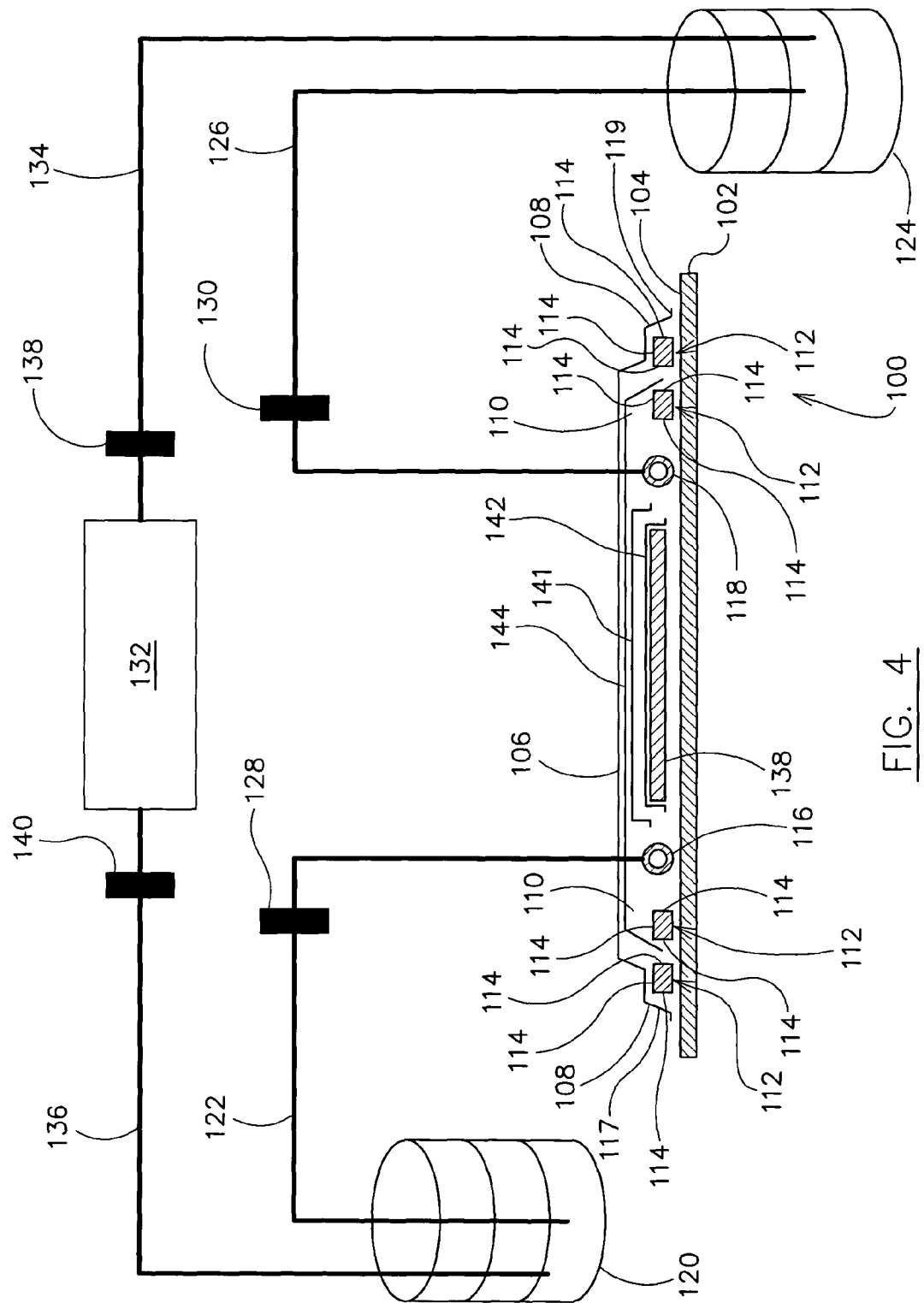
FIG. 4 is a schematic vertical cross-section of the vacuum assisted resin transfer mold of the present invention.

FIGS. 3 and 4 illustrate a vacuum assisted resin transfer mold of the present invention designated in its entirety by the reference numeral 100. The mold 100 includes a tool 102 having a surface 104 shaped to correspond to a composite structure (e.g., the composite structure 20 illustrated in FIG. 1) and an inflatable bladder 106 for forcing the composite structure against the tool during a vacuum assisted resin transfer molding process. Although the mold 100 is illustrated and described herein as including only one bladder 106, the mold may include multiple bladders without departing from the scope of the present invention. The bladder 106 is positioned over the tool surface 104 and generally sealed with the tool surface along a plurality of edges 108 of the bladder to form a mold cavity 110 at least partially defined by the tool surface and the bladder. In the exemplary embodiment, the bladder edges 108 are taped to the tool surface 104 to seal the bladder 106 to the surface, and further, the bladder 106 overlays a plurality of air dams, generally referred to by the reference numeral 112, adjacent the bladder edges 108 to facilitate sealing the edges to the tool surface 104. In one embodiment, surfaces 114 of the air dams 112 are coated with a suitable material (e.g., a mold release material such as A4000, a polytetrafluoroethylen film available from Coastline International Distributors Limited of Lindenhurst, N.Y.) to provide a release film surface for separating the bladder 106 from the air dams 112, and more specifically the surfaces 114, after the composite structure is cured.

The mold 100 includes a resin inlet 116 in fluid communication with the mold cavity 110 and a vacuum port 118 in fluid communication with the cavity and spaced from the resin inlet 116. In the exemplary embodiment, the resin inlet 116 is adjacent a first end 117 of the mold cavity 110 and the vacuum port 118 is adjacent a second end 119 of the mold cavity opposite the first end. However, it should be understood that the location of both the resin inlet 116 and the vacuum port 118 may vary without departing from the scope of the present invention. A resin source 120 containing a supply of resin is connected by tubing 122 to the resin inlet 116, and a vacuum reservoir 124 is connected by tubing 126 to the vacuum port 118 so the resin source and vacuum reservoir are in fluid communication with the mold cavity 110. An inlet valve 128 is mounted along the tubing 122 between the resin source 120 and the resin inlet 116 and is operable to selectively permit and restrict fluid flow between the resin inlet and the resin source. Additionally, a vacuum valve 130 is mounted along the tubing 126 between the vacuum port 118 and the vacuum reservoir 124 and is operable to selectively permit and restrict fluid flow between the vacuum port and the vacuum reservoir.

The mold 100 also includes a pump 132 connected by tubing 134 to the vacuum reservoir 124 and connected by tubing 136 to the resin source 120 so the pump is in fluid communication with both the vacuum reservoir and the resin source. In the exemplary embodiment, a first pump valve 138 is mounted along the tubing 134 between the pump 132 and the vacuum reservoir 124 and is operable to selectively allow and restrict fluid flow between the pump and the vacuum reservoir. Additionally, in the exemplary embodiment, a second pump valve 140 is mounted along the tubing 136 between the pump 132 and the resin source 120 and is operable to selectively allow and restrict fluid flow between the pump and the resin source.

To mold the composite structure, at least one edge 108 of the bladder 106 is removed from the tool surface 104 to open the mold cavity 110. A plurality of fiber plies (e.g., the fiber plies 24 illustrated in FIG. 1) are loaded into the mold cavity 110 and stacked to form a preform 138. As will be appreciated by those skilled in the art, the size, number, and orientation of the plies may be selected to provide desired material properties for the finished composite structure. In one embodiment, at least one thin sheet of another material, for example a thin sheet of metal foil (not shown), is stacked with the fiber plies. Additionally, in the exemplary embodiment, a resin distribution medium 141 (e.g., Nylon Plastinet™ sold by AET Speciality Nets & Nonwovens of Middletown, Del.) is positioned between the preform 138 and the bladder 106 to facilitate even infusion of resin into the preform. Furthermore, in the exemplary embodiment a release ply 142 that is porous to resin is positioned between the preform 138 and the resin distribution medium 141 to facilitate removal of the resin distribution medium from the composite structure after infusion of resin into the preform 138. Another release ply 144 may be positioned between the resin distribution medium 141 and the inflatable bladder 106 to facilitate removal of the bladder 106 from the resin distribution medium. The cavity is closed by re-sealing the edges 108 removed from the tool surface 104. The first pump valve 138, the vacuum valve 130, and the inlet valve 128 are opened, and the pump 132 is activated to draw a vacuum at the vacuum port 118 and thereby introduce resin into the mold cavity 110 by drawing resin from the resin source 120 through the resin inlet 116 and into the cavity. In one embodiment, the resin inlet 116 includes a helical spring extension (not shown) extending into the mold cavity 110 to facilitate introduction of resin into the cavity. As the resin is introduced into the mold cavity 110, the resin infuses in the preform 138 and intersperses between the reinforcing fibers of each ply loaded in the cavity to form the composite structure. Additionally, the vacuum applied to the mold cavity 110 forces the bladder 106 against the composite structure and thereby forces the composite structure against the tool surface 104. Once the introduction and infusion of resin is complete, the first pump valve 138, the vacuum valve 130, and the inlet valve 128 are closed, and the pump 70 is deactivated, to terminate introduction of resin into the mold cavity 100.

To draw any excess resin away from the composite structure, the first pump valve 138, the second pump valve 142, the vacuum valve 130, and the inlet valve 128 are opened, and the pump 132 is activated to pull a vacuum at the resin inlet 116 and the vacuum outlet 118. The vacuum pulled at the inlet 116 and the outlet 118 draws excess resin away from the composite structure through the inlet 116 and the outlet 118. The excess resin is drawn into the resin source 120 and the vacuum reservoir 124 where it is collected. Once the composite structure is free of excess resin, it can then be removed from the mold cavity 110 and processed for ultimate use. In some cases, the composite structure may be cured after being removed from the mold cavity 110 to facilitate bonding the fiber plies and the resin (in addition to any other materials) together.

The above-described vacuum assisted resin transfer mold is cost-effective and reliable for molding composite structures. More specifically, by applying a vacuum to both a resin inlet and a vacuum port of the mold after infusion is complete, the present invention draws excess resin away from the composite. By removing excess resin, the above-described mold produces composite structures that have a lower resin volume, a lower per ply thickness, and a high fiber volume as compared to traditional resin transfer molding processes. Accordingly, the present invention increases the tensile and compressive strength of resin transfer molded composite structures resulting in expanded weight and/or strength design envelopes. Additionally, the present invention may also produce composite structures having less variation in thickness along their length as compared to traditional autoclave-cured composites.

Exemplary embodiments of vacuum assisted resin transfer molds are described above in detail. The molds are not limited to the specific embodiments described herein, but rather, components of each mold may be utilized independently and separately from other components described herein. Each vacuum assisted resin transfer mold component can also be used in combination with other vacuum assisted resin transfer mold components.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method for vacuum assisted resin transfer molding a composite structure comprising fibers at least partially surrounded by resin using a mold comprising a tool having a surface shaped to correspond to the composite structure and an inflatable bladder for forcing the composite structure against the tool, a resin inlet connected to a resin source for introducing resin into a mold cavity at least partially defined by the tool surface and the bladder and a vacuum port spaced from the resin inlet, said method comprising the steps of:
   opening the mold cavity;
   loading fibers into the open mold cavity;
   closing the loaded mold cavity;
   introducing resin through the resin inlet into the closed mold cavity loaded with fibers; and
   pulling a vacuum at the resin inlet and the vacuum port to draw excess resin from the structure prior to curing thereof.

2. A method in accordance with claim 1 wherein a pump is in fluid communication with the vacuum port and said step of introducing resin into the mold cavity comprises activating the pump to apply a vacuum to the vacuum port.

3. A method in accordance with claim 1 wherein a pump is in fluid communication with the resin inlet and the vacuum port, and said step of pulling a vacuum at the resin inlet and the vacuum port comprises activating the pump to apply a vacuum to the resin inlet and the vacuum port.

4. A method in accordance with claim 1 further comprising curing the structure after pulling the vacuum to draw excess resin from the structure.

5. A method in accordance with claim 1 wherein the vacuum port is in fluid communication with a pump and a vacuum reservoir, and said step of introducing resin into the mold cavity comprises:
   opening an inlet valve mounted between the resin inlet and the resin source to allow resin to flow from the resin source to the cavity;
   opening a vacuum valve mounted between the vacuum port and the vacuum reservoir to allow fluid flow from the cavity to the vacuum reservoir; and
   activating the pump to apply a vacuum to the vacuum port for drawing resin into the chamber and infusing the resin into the structure.

6. A method in accordance with claim 5 further comprising the step of terminating introduction of resin into the cavity by closing the inlet valve and closing the vacuum valve.

7. A method in accordance with claim 1 wherein the vacuum port is in fluid communication with a pump and a vacuum reservoir, and said step of pulling a vacuum at the resin inlet and the vacuum port comprises:
   opening an inlet valve mounted between the resin inlet and the resin source to allow resin to flow from the cavity to the resin source;
   opening a vacuum valve mounted between the vacuum port and the vacuum reservoir to allow resin to flow from the cavity to the vacuum reservoir; and
   activating the pump to apply a vacuum to the resin inlet and to the vacuum port to draw excess resin away from the structure through the resin inlet and the vacuum port.

* * * * *